United States Patent
Hirashima

(10) Patent No.: US 10,511,229 B2
(45) Date of Patent: Dec. 17, 2019

(54) POWER CONVERTER WITH TWO CAPACITORS ACCOMMODATED IN A HOUSING

(71) Applicant: DENSO CORPORATION, Kariya, Aichi-pref. (JP)

(72) Inventor: Shigeo Hirashima, Kariya (JP)

(73) Assignee: DENSO CORPORATION, Kariya (JP)

( * ) Notice: Subject to any disclaimer, the term of this patent is extended or adjusted under 35 U.S.C. 154(b) by 280 days.

(21) Appl. No.: 15/374,464

(22) Filed: Dec. 9, 2016

(65) Prior Publication Data

US 2017/0170736 A1 Jun. 15, 2017

(30) Foreign Application Priority Data

Dec. 10, 2015 (JP) ................................. 2015-241100

(51) Int. Cl.
| | | |
|---|---|---|
| *H02M 7/00* | (2006.01) | |
| *H02M 3/335* | (2006.01) | |
| *H02M 1/44* | (2007.01) | |
| *H02M 3/28* | (2006.01) | |

(52) U.S. Cl.
CPC ......... *H02M 3/33507* (2013.01); *H02M 1/44* (2013.01); *H02M 3/28* (2013.01); *H02M 7/003* (2013.01)

(58) Field of Classification Search
CPC .................................................. H02M 7/003
USPC .................. 363/146, 147; 361/816, 818, 800
See application file for complete search history.

(56) References Cited

U.S. PATENT DOCUMENTS

| | | | |
|---|---|---|---|
| 2013/0021771 A1 | 1/2013 | Goto | |
| 2013/0100634 A1* | 4/2013 | Okubo | H01F 27/36 361/816 |
| 2014/0233281 A1* | 8/2014 | Goto | H02M 7/003 363/39 |

FOREIGN PATENT DOCUMENTS

JP 2004-297996 A 10/2004

\* cited by examiner

*Primary Examiner* — Alex Torres-Rivera
(74) *Attorney, Agent, or Firm* — Oliff PLC

(57) ABSTRACT

A power converter for converting an input voltage into a predetermined voltage. The power converter includes a housing including a conductive portion. At least two capacitors are electrically connected to the conductive portion. A transformer, which is configured to serve as a choke coil, includes a winding and a core surrounding the winding with a portion of the winding being exposed from the core. The winding includes a lead that is led out from the exposed portion of the winding to the exterior of the transformer. The at least two capacitors, the lead, and the conductive portion of the housing form a loop circuit together. At least part of the exposed portion of the winding overlaps an internal region of the loop circuit, in a front view of the transformer as seen from a direction in which the lead is led out from the exposed portion of the winding.

12 Claims, 4 Drawing Sheets

POWER CONVERTER WITH TWO CAPACITORS ACCOMMODATED IN A HOUSING

CROSS-REFERENCE TO RELATED APPLICATION

This application is based on and claims the benefit of priority from earlier Japanese Patent Application No. 2015-241100 filed Dec. 10, 2015, the description of which is incorporated herein by reference.

BACKGROUND

Technical Field

The present invention relates to a power converter for converting an input voltage to a predetermined voltage and outputting the predetermined voltage.

Related Art

A known power converter, as disclosed in Japanese Patent Application Laid-Open Publication No. 2013-27077, includes a transformer, a filter circuit having a reactor and a capacitor, and an output terminal electrically connected to the filter circuit. The filter circuit is positioned adjacent to the transformer. The transformer can be a source of conducted noise conducted toward the output terminal via wiring connected to the transformer. This conducted noise is removed by the filter circuit.

The transformer can also be a source of radiated noise traveling through air. The power converter disclosed in Japanese Patent Application Laid-Open Publication No. 2013-27077 further includes a shield plate positioned between the filter circuit and the transformer to shield the radiated noise generated in the transformer. This configuration can prevent the radiated noise from adversely affecting the filter circuit or from traveling to the exterior of the power converter via the output terminal.

The above configuration using the shield plate requires a shield plate and a plurality of fixation elements for fixing the shield plate, which may increase the number of components of the power converter.

In consideration of the foregoing, exemplary embodiments of the present invention are directed to providing a power converter capable of reducing radiated noise emitted from a transformer while preventing an increase in the number of components.

SUMMARY

In accordance with an exemplary embodiment of the present invention, there is provided a power converter for converting an input voltage into a predetermined voltage, including: a housing including a conductive portion; at least two capacitors accommodated in the housing and electrically connected to the conductive portion of the housing; and a transformer accommodated in the housing and configured to serve as a choke coil, the transformer including a winding and a core surrounding the winding with a portion of the winding being exposed from the core, the winding including a lead that is led out from the exposed portion of the winding to the exterior of the transformer. In the power converter, the at least two capacitors, the lead, and the conductive portion of the housing form a loop circuit together, and at least part of the exposed portion of the winding overlaps an internal region of the loop circuit, in a front view of the transformer as seen from a direction in which the lead is led out from the exposed portion of the winding.

The power converter configured as above includes the transformer, which serves as a choke coil. During operation of the power converter, the radiated noise might risk being emitted from the exposed portion of the winding not only to the interior of the power converter, but also to the exterior of the power converter, which may adversely affect operations of various external electronic devices.

However, the power converter configured as above includes at least two capacitors electrically connected to the conductive portion of the housing. The at least two capacitors, the lead, and the conductive portion of the housing form a loop circuit. At least part of the exposed portion of the winding overlaps an internal region of the loop circuit, in a front view of the transformer as seen from a direction in which the lead is led out from the exposed portion of the winding. Passage of the radiated noise emitted from the transformer through the internal region of the loop circuit will induce a current flowing through the loop circuit, which can cause the radiated noise to be absorbed by the loop circuit. Thus, the radiated noise emitted from the transformer can be reduced without providing the shield plate as disclosed in Japanese Patent Application Laid-Open Publication No. 2013-27077. In addition, conducted noise generated in the transformer can also be absorbed by the at least two capacitors forming the loop circuit cooperatively with the lead.

The loop circuit for reducing the radiated noise is formed utilizing the conductive portion of the housing and the lead of the transformer. This configuration can reduce the number of additional components for forming the loop circuit. Therefore, the radiated noise emitted from the transformer can be reduced while reducing the number of components.

BRIEF DESCRIPTION OF THE DRAWINGS

FIG. 3 is a front view of the composite transformer of FIG. 2 in a direction of arrow a;

DESCRIPTION OF SPECIFIC EMBODIMENTS

Figure 1:
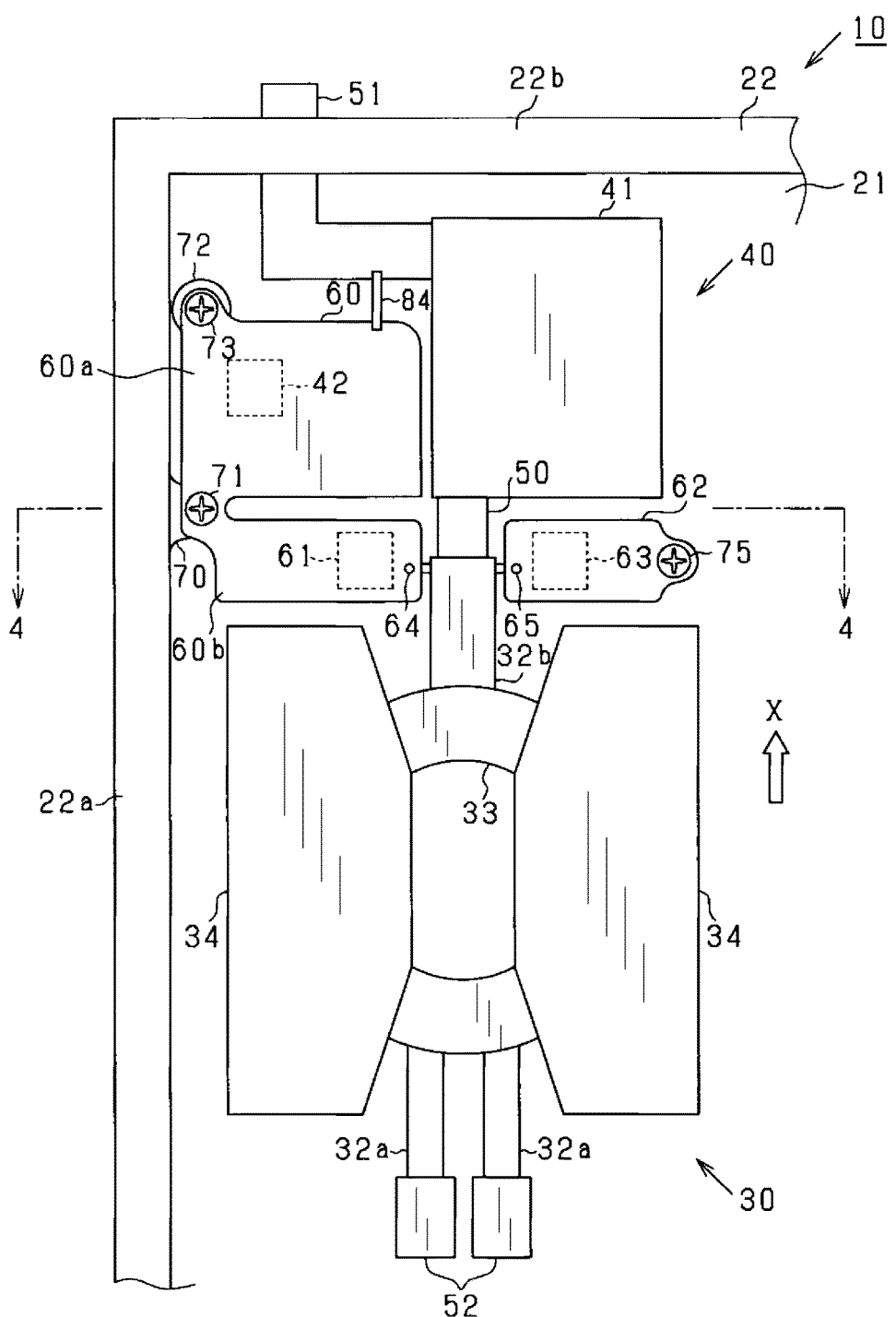
FIG. 1 is a plan view of a power converter with a lid removed in accordance with one embodiment of the present invention.

The invention will now be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

A power converter in accordance with one embodiment of the present invention may be mounted in a vehicle, such as an electrical vehicle or a hybrid vehicle. The power converter includes a DC-DC converter.

As shown in FIGS. 1-4, the power converter 10 includes a housing 20. The housing 20 includes a rectangular bottom panel 21, a rectangular frame-shaped sidewall 22 formed along the periphery of the bottom panel 21, and a rectangular lid 23. The lid 23 covers an opening formed on an opposite side of the sidewall 22 from the bottom panel 21 in a wall-height direction of the sidewall 22. In the present embodiment, the housing 20 is formed of a shielding material, e.g., a metal material. In the present embodiment, the housing 20 is formed of an aluminum material by die-casting. Particularly, in the present embodiment, the bottom panel 21 and the sidewall 22 are integrally formed with each other by die-casting.

The bottom panel 21, the sidewall 22, and the lid 23 form a housing 20 having an accommodation space to accommodate various electronic components forming the DC-to-DC converter.

Figure 2:
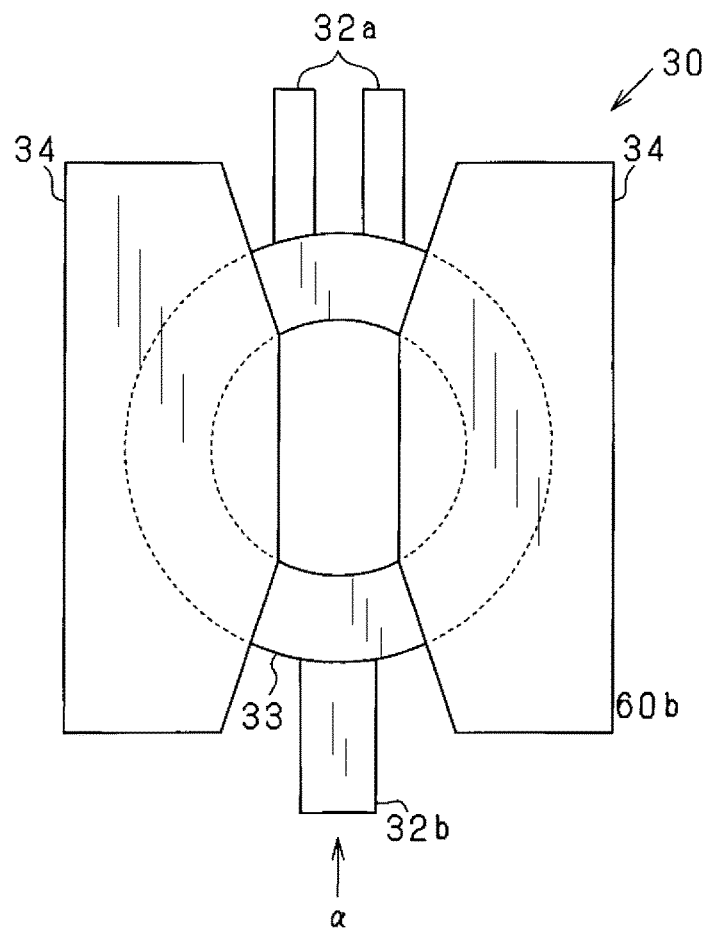
FIG. 2 is a plan view of a composite transformer.
Figure 3:
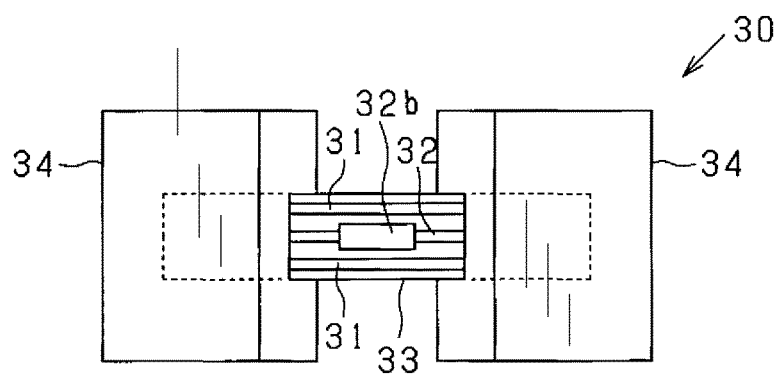
Figure 4:
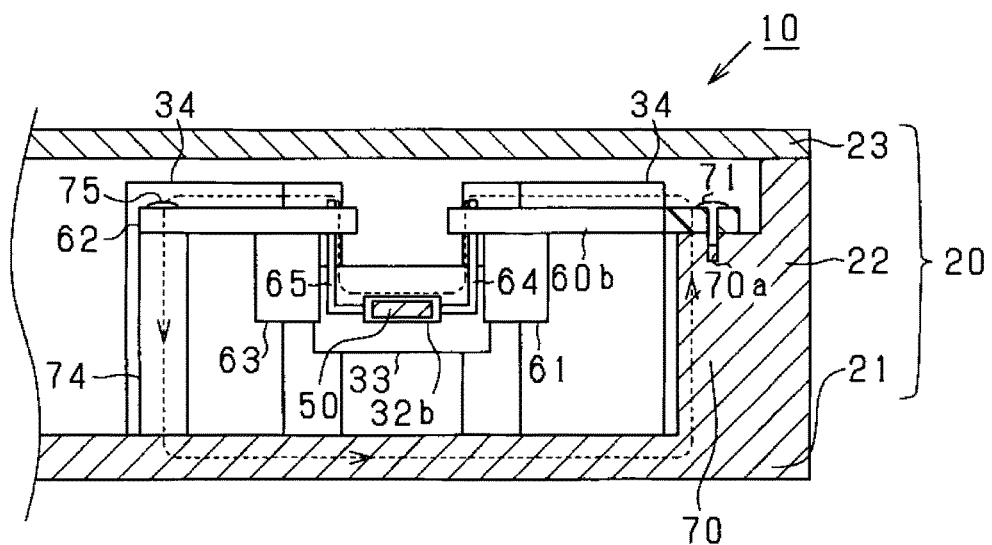
FIG. 4 is a cross-sectional view of the power converter taken along line 4-4 of FIG. 1.

A transformer 30 is accommodated in the housing 20. The transformer 30 is provided on the bottom panel 21. As shown in FIGS. 2, 3, the transformer 30 includes a primary-side winding 31, a secondary-side winding 32 electrically isolated form the primary-side winding 31 and configured to be magnetically coupled to the primary-side winding 31, a bobbin 33 around which the windings 31, 32 are wound, and cores 34. The transformer 30 is a composite transformer that also serves as a choke coil. In FIG. 4, the primary-side winding 31 and the secondary-side winding 32 are not shown.

The secondary-side winding 32 is flattened and C-shaped like an annulus having a cutout. The secondary-side winding 32 includes a pair of first leads 32a extending outward from a pair of ends facing the cutout, and a second lead 32b extending straight or linearly from a portion of the secondary-side winding 32 opposite the cutout in a direction opposite a direction in which the first leads 32a extend. In the present embodiment, the second lead 32b is an elongated strip. In some embodiments, a distal end portion of the second lead 32 may be bent depending on a shape of a terminal that the second lead 32 is to be connected to.

The transformer 30 of the present embodiment includes a pair of cores 34 spaced from each other. In the present embodiment, the cores 34 are formed of a magnetic material, more specifically, ferrite. The pair of cores 34 are attached to the bobbin 33 such that the bobbin 33 is sandwiched by the pair of cores 34 in a direction perpendicular to the center axis of a core of the bobbin 33, around which the primary-side winding 31 and the secondary-side winding 32 are wound. This configuration allows a portion of each of the primary-side winding 31 and the secondary-side winding 32 to be exposed from the pair of cores 34. Particularly, in the present embodiment, the first leads 32a and the second lead 32b are led out from the exposed portion of the secondary-side winding 32.

Within the housing 20, the transformer 30 is disposed adjacent to a first sidewall segment 22a that is one of four sidewall segments of the sidewall 22. More specifically, the transformer 30 is disposed with a side of one of the cores 34 facing an internal wall surface of the first sidewall segment 22a.

A filter circuit 40 is accommodated in the housing 20. The filter circuit 40 is provided on the bottom panel 21. The filter circuit 40 is disposed between a second sidewall segment 22b and the transformer 30, where the second sidewall segment 22b is another one of the four sidewall segments of the sidewall 22 and is adjacent to the first sidewall segment 22a. The filter circuit 40 includes a reactor 41 and a filter capacitor 42. The transformer 30 is positioned with the second lead 32b being oriented toward the reactor 41. The reactor 41 is electrically connected to the second lead 32b through a first conductive member 50, such as a bus bar.

Within the housing 20, a first substrate 60 is disposed in a space surrounded by the first sidewall segment 22a, the second sidewall segment 22b, the reactor 41, and the transformer 30. The first substrate 60 is positioned such that a lower surface of the first substrate 60 is spaced from the bottom panel 21 and substantially parallel to an upper surface of the bottom panel 21.

The first substrate 60 is mechanically connected to the housing 20 via a first boss 70 and a second boss 72 that are both located in the space surrounded by the first sidewall segment 22a, the second sidewall segment 22b, the reactor 41, and the transformer 30. The first boss 70 is located just adjacent to the first sidewall segment 22a and closer to the transformer 30 than the second boss 72. The first boss 70 is formed of an aluminum material and integrally formed with the bottom panel 21 and the first sidewall segment 22a by die-casting. Therefore, the first boss 70 is conductive.

Within the housing 20, the second boss 72 is located just adjacent to the first sidewall segment 22a and closer to the second sidewall segment 22b than the first boss 70. The second boss 72 is formed of an aluminum material and integrally formed with the bottom panel 21 by die-casting. Therefore, the second boss 72 is conductive. In an alternative embodiment, the first boss 70 and the second boss 72 may be components separate from the housing 20.

Each of the first boss 70 and the second boss 72 has a threaded bore. FIG. 4 illustrates the threaded bore 70a of the first boss 70. In order to secure the first substrate 60 to the first boss 70 and the second boss 72, conductive metallic screws 71, 73 are threaded into the threaded bores of the first boss 70 and the second boss 72 with the first substrate 60 mounted on apexes of the first boss 70 and the second boss 72.

The first substrate 60 includes a major substrate 60a and a secondary substrate 60b. The major substrate 60a is located between the first boss 70 and the second boss 72. The filter capacitor 42 of the filter circuit 40 is disposed on a lower surface of the major substrate 60a facing the bottom panel 21. The filter capacitor 42 is electrically connected to the housing 20 via the second boss 72. This is because, in the present embodiment, the housing 20 is used as ground.

The secondary substrate 60b is located on an opposite side of the first boss 70 from the second boss 72. A first capacitor 61 is disposed on a lower surface of the secondary substrate 60b facing the bottom panel 21.

Within the housing 20, a second substrate 62 is disposed on an opposite side of the first conductive member 50 and the second lead 32b from the secondary substrate 60b. The second substrate 62 is positioned such that a lower surface of the second substrate 62 is spaced from the bottom panel 21 and substantially parallel to the upper surface of the bottom panel 21. The second substrate 62 is positioned at the same height as the first substrate 60 in the wall-height direction of the sidewall 22.

As shown in FIG. 4, the second substrate 62 is mechanically connected to the housing 20 via a third boss 74. In the present embodiment, the third boss 74 is located on an opposite side of the bobbin 33 from the first sidewall segment 22a, in a front view of the transformer 30 as seen from the direction of arrow X. The third boss 74 is formed of an aluminum material and integrally formed with bottom panel 21 by die-casting. Therefore, the third boss 74 is conductive. In an alternative embodiment, the third boss 74 may be a component separate from the housing 20.

The third boss 74 has a threaded bore. In order to secure the second substrate 62 to the third boss 74, a conductive metallic screw 75 is threaded into the threaded bore of the third boss 74 with the second substrate 62 mounted on an apex of the third boss 74.

A second capacitor 63 is disposed on a lower surface of the second substrate 62 facing the bottom panel 21.

A first terminal of the first capacitor 61 is electrically connected to the housing 20 as ground through the wiring pattern on the secondary substrate 60b and the first boss 70. A second terminal that is a terminal, other than the first terminal, of the first capacitor 61 is electrically connected to the second lead 32b through the wiring pattern on the secondary substrate 60b and the second conductive member 64. As shown in FIG. 4, the second conductive member 64 is L-shaped, in the front view of the transformer 30 as seen from the direction of arrow X. The second conductive member 64 may be a component integrally formed with the first conductive member 50.

A first terminal of the second capacitor 63 is electrically connected to the housing 20 as ground through a wiring pattern on the second substrate 62 and the third boss 74. A second terminal that is a terminal, other than the first terminal, of the second capacitor 63 is electrically connected to the second lead 32b through the wiring pattern on the second substrate 62 and the third conductive member 65. As shown in FIG. 4, the third conductive member 65 is L-shaped, in the front view of the transformer 30 as seen from the direction of arrow X. The third conductive member 65 is provided on an opposite side of the second lead 32b from the second conductive member 64. The third conductive member 65 may be a component integrally formed with the first conductive member 50.

An output terminal 51 for electrically connecting the power converter 10 to an external device is provided on a portion of the second sidewall segment 22b facing the filter circuit 40. That is, the output terminal 51 is located on an opposite side of the filter circuit 40 from the transformer 30 and adjacent to the filter circuit 40.

Figure 5:
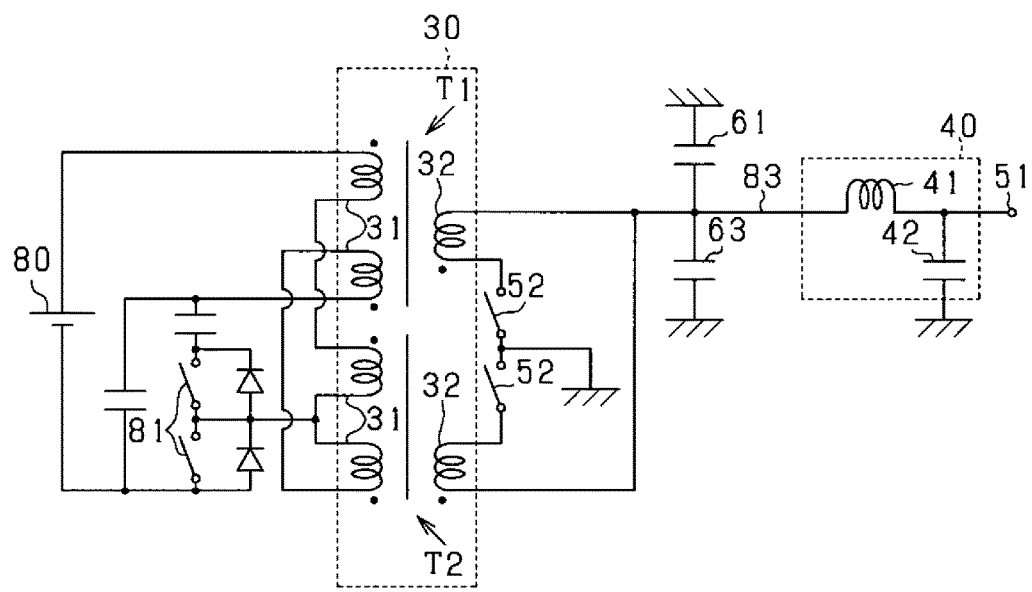
FIG. 5 is a circuit diagram of a DC-to-DC converter.

A circuit diagram of the DC-to-DC converter of the present embodiment will now be described with reference to FIG. 5. The DC-to-DC converter is operative to convert a voltage of the DC power source 80 to output the converted voltage.

The DC-to-DC converter includes the transformer 30, switching elements 81, 52, such as metal-oxide semiconductors (MOSs), the filter circuit 40, the first capacitor 61, and the second capacitor 63. The transformer 30 includes two transformers T1, T2. Each of the transformer T1, T2 includes the primary-side winding 31 and the secondary-side winding 32.

For each of the secondary-side windings 32, a first end of the secondary-side winding 32 is electrically connected to the switching element 52, and a second end, other than the first end, of the secondary-side winding 32 is electrically connected to the positive side output line 83. In the present embodiment, the positive side output line 83 includes the second lead 32b and the first conductive member 50. The output terminal 51 is electrically connected to the positive side output line 83 through the filter circuit 40. A connecting line electrically connecting the filter capacitor 42 of the filter circuit 40 and the output terminal 51 is shown as a connecting line 84 in FIG. 1.

The second terminal of the first capacitor 61 is electrically connected to the positive side output line 83 through the second conductive member 64 and the wiring pattern on the secondary substrate 60b. The first terminal of the first capacitor 61 is electrically connected to ground through the wiring pattern on the secondary substrate 60b and the first boss 70. The second terminal of the second capacitor 63 is electrically connected to the positive side output line 83 through the third conductive member 65 and the wiring pattern on the second substrate 62. The first terminal of the second capacitor 63 is electrically connected to ground through the wiring pattern on the second substrate 62 and the third boss 74.

In the transformer 30 of the present embodiment, more noise is emitted from portions, exposed from the cores 34, of the respective windings 31, 32. More specifically, in the front view of the transformer 30 as seen from the direction of arrow X, a portion, exposed from the pair of cores 34, of a bobbin assembly, where noise levels are high, is defined as a portion to be shielded of the transformer 30. The bobbin assembly is an assembly of the bobbin 33 and the primary-side and secondary-side windings 31, 32 wound around the bobbin 33.

The present embodiment described above can provide the following advantages.

In the present embodiment, as depicted by a broken line in FIG. 4, the first capacitor 61, the second conductive member 64, the second lead 32b, the third conductive member 65, the second capacitor 63, the third boss 74, the bottom panel 21, and the first boss 70 form a loop circuit. In a front view of the transformer 30 as seen from the direction of arrow X, part of the portion to be shielded of the transformer 30 overlaps an internal region of the loop circuit. Passage of the radiated noise emitted from the transformer 30 through the internal region of the loop circuit will induce a current flowing through the loop circuit, which can cause the radiated noise to be absorbed by the loop circuit. Thus, the radiated noise emitted from the transformer 30 can be reduced without providing the shield plate as disclosed in Japanese Patent Application Laid-Open Publication No. 2013-27077.

Conducted noise generated in the transformer 30 can also be absorbed by the first and second capacitors 61, 63 forming the loop circuit cooperatively with the second lead 32b.

In the present embodiment, the loop circuit for reducing the radiated noise is formed utilizing the housing 20 and the second lead 32b of the transformer 30. This configuration can reduce the number of additional components for forming the loop circuit. Therefore, according to the present embodiment, the radiated noise emitted from the transformer 30 can be reduced while reducing the number of components.

In the present embodiment, the transformer 30 is disposed within an accommodation space of the housing 20 with the portion to be shielded of the transformer 30 being oriented toward the filter circuit 40. The internal region of the loop circuit is interposed between part of the portion to be shielded of the transformer 30 and the filter circuit 40 and between the part of the portion to be shielded of the transformer 30 and the output terminal 51. This configuration can prevent the radiated noise from adversely affecting the filter circuit or from traveling to the exterior of the power converter via the output terminal 51.

The first and second capacitors 61, 63 are disposed in a space between the transformer 30 and the filter circuit 40. This configuration can enhance radiated noise mitigation by the loop circuit.

The lid 23 is provided above the transformer 30. The shielding effect of the lid 23 can reduce the radiated noise emitted upward from the transformer 30.

The first leads 32a and the switching elements 52 are disposed on an opposite side of the transformer 30 from the output terminal 51. This configuration can prevent the radiated noise emitted from part of the exposed portion of the transformer 30 around the first leads 32a and the switching elements 52 from escaping to the exterior of the power converter via the output terminal 51.

The first capacitor 61 and the second capacitor 63 are part of the loop circuit, where the first capacitor 61 is disposed in a space between the secondary substrate 60b and the bottom panel 21 and the second capacitor 63 is disposed in a space between the second substrate 62 and the bottom panel 21. The capacitors 61, 63 that are high-profile components are disposed in such spaces between the substrates 60, 62 and the bottom panel 21, which can prevent an increase in dimension of the power converter 10 in a wall-height direction of the sidewall 22 while reducing the radiated noise.

Modifications

It is to be understood that the invention is not to be limited to the specific embodiment disclosed above and that modifications and other embodiments are intended to be included within the scope of the appended claims.

Figure 6:
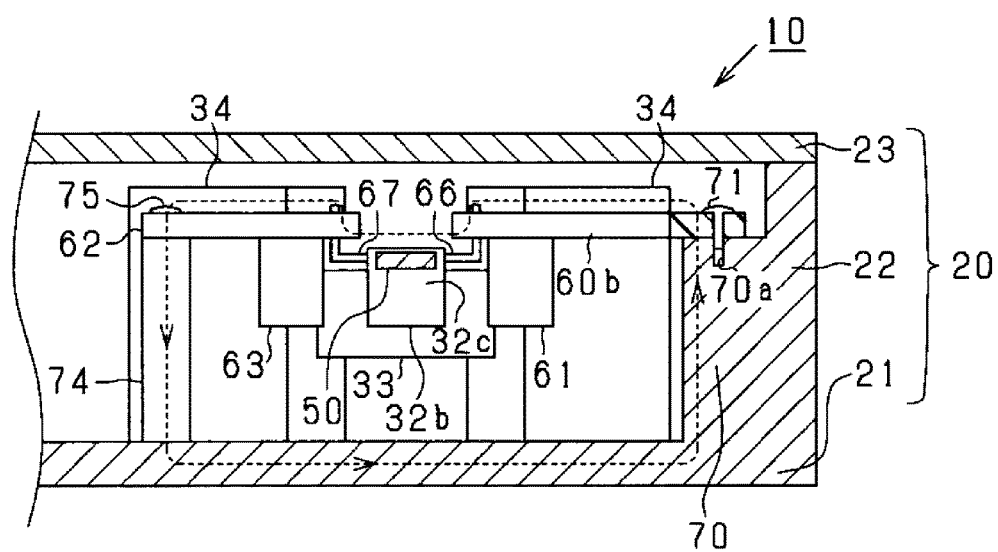
FIG. 6 is a partial cross-sectional view of a power converter in accordance with another embodiment of the present invention.

(M1) Preferably, in a front view of the transformer 30 as seen from a direction in which the second lead 32b extends, the whole of the portion to be shielded of the transformer 30 may be included in the internal region of the loop circuit. FIG. 6 illustrates an example of such a configuration. FIG. 6 corresponds to FIG. 4. In FIG. 6, members that are identical to those in FIG. 4 are provided with identical reference numbers.

A bent tip portion 32c extending upwardly in the wall-height direction of the sidewall 22 is provided at the distal end of the second lead 32b. The bent tip portion 32c is bent upward from the second lead 32b and angled at a right angle to the second lead 32b. The second terminal of the first capacitor 61 is electrically connected to the bent tip portion 32c through the wiring pattern on the secondary substrate 60b and the conductive member 66. The second terminal of the second capacitor 63 is electrically connected to the bent tip portion 32c through the wiring pattern on the second substrate 62 and the conductive member 67. This configuration allows the loop circuit to cancel the radiated noise, thereby shielding the radiated noise.

(M2) In the above embodiment, the whole of the housing 20 is formed of a metal material. Alternatively, only the whole or part of the bottom panel 21 of the housing 20 may be formed of a metal material.

(M3) In the above embodiment, the first and second capacitors 61, 63 are disposed in a space between the transformer 30 and the filter circuit 40, which space is part of the accommodation space of the housing 20. Alternatively, the first and second capacitors 61, 63 may be disposed in the other part of the accommodation space of the housing 20.

(M4) In the above embodiment, the number of capacitors included in the loop circuit is two. Alternatively, the number of capacitors included in the loop circuit may be equal to or greater than three.

(M5) In the above embodiment, the reactor 41 is included in the filter circuit 40, but is not essential. If the first capacitor 61 and the second capacitor 63 can provide sufficient noise mitigation, the filter circuit 40 itself may be removed. In such a case, the loop circuit may be disposed in a space between the transformer 30 and the output terminal 51.

(M6) The transformer of the above embodiment may be replaced with a transformer having any other configuration, provided that the radiated noise is emitted from an exposed portion of the transformer.

(M7) In the above embodiment, the power conversion circuit is a DC-to-DC converter operative to convert a direct current (DC) voltage into another DC voltage, e.g., a predetermined DC voltage. Alternatively, the power conversion circuit may be an inverter operative to convert a DC voltage into an alternating current (AC) voltage.

What is claimed is:

1. A power converter for converting an input voltage into a predetermined voltage, comprising:
    a housing comprising a conductive portion;
    at least two capacitors accommodated in the housing and electrically connected to the conductive portion of the housing;
    a transformer accommodated in the housing and configured to serve as a choke coil, the transformer comprising a winding and a core surrounding the winding with a portion of the winding being exposed from the core, the winding including a lead that is led out from the exposed portion of the winding to an exterior of the transformer; and
    a filter circuit accommodated in the housing, the filter circuit being electrically connected to the lead and configured to remove conducted noise,
    wherein the at least two capacitors, the lead, and the conductive portion of the housing form a loop circuit together,
    at least part of the exposed portion of the winding overlaps an internal region of the loop circuit, in a front view of the transformer as seen from a direction in which the lead is led out from the exposed portion of the winding,
    the transformer is disposed within the housing such that the exposed portion of the winding is oriented toward the filter circuit,
    the internal region of the loop circuit is interposed between the at least part of the exposed portion of the winding and the filter circuit, and
    a whole extent of the exposed portion of the winding overlaps the internal region of the loop circuit, in the front view of the transformer as seen from the direction in which the lead is led out from the exposed portion of the winding.

2. The power converter according to claim 1, further comprising:
    an output terminal configured to electrically connect the power converter to an external device,
    wherein the transformer is disposed within the housing such that the exposed portion of the winding is oriented toward the output terminal, and the internal region of the loop circuit is interposed between the at least part of the exposed portion of the winding and the output terminal.

3. The power converter according to claim 1, further comprising:
an output terminal disposed on an opposite side of the filter circuit from the transformer and configured to electrically connect the power converter to an external device,
wherein the internal region of the loop circuit is interposed between the at least part of the exposed portion of the winding and the output terminal.

4. The power converter according to claim 1, wherein the lead comprises a portion extending straight from the exposed portion of the winding, and
the at least part of the exposed portion of the winding overlaps the internal region of the loop circuit, in a front view of the transformer as seen from a direction along the portion of the lead extending straight from the exposed portion of the winding.

5. A power converter for converting an input voltage into a predetermined voltage, comprising:
a housing comprising a conductive portion;
at least two capacitors accommodated in the housing and electrically connected to the conductive portion of the housing;
a transformer accommodated in the housing and configured to serve as a choke coil, the transformer comprising a winding and a core surrounding the winding with a portion of the winding being exposed from the core, the winding including a lead that is led out from the exposed portion of the winding to an exterior of the transformer; and
a filter circuit accommodated in the housing, the filter circuit being electrically connected to the lead and configured to remove conducted noise,
wherein the at least two capacitors, the lead, and the conductive portion of the housing form a loop circuit,
at least part of the exposed portion of the winding overlaps an internal region of the loop circuit in a front view of the transformer as seen from a direction in which the lead is led out from the exposed portion of the winding,
the transformer is disposed within the housing such that the exposed portion of the winding is oriented toward the filter circuit,
the internal region of the loop circuit is interposed between the at least part of the exposed portion of the winding and the filter circuit, and
a whole extent of the exposed portion of the winding overlaps the internal region of the loop circuit in the front view of the transformer as seen from the direction in which the lead is led out from the exposed portion of the winding.

6. The power converter according to claim 5, further comprising:
an output terminal disposed on an opposite side of the filter circuit from the transformer and configured to electrically connect the power converter to an external device,
wherein the internal region of the loop circuit is interposed between the at least part of the exposed portion of the winding and the filter circuit and between the at least part of the exposed portion of the winding and the output terminal.

7. The power converter according to claim 5, wherein the lead includes a portion extending straight from the exposed portion of the winding, and
the at least part of the exposed portion of the winding overlaps the internal region of the loop circuit in a front view of the transformer as seen from a direction along the portion of the lead extending straight from the exposed portion of the winding.

8. A power converter for converting an input voltage into a predetermined voltage, comprising:
a housing including a conductive portion, the conductive portion including a conductive bottom panel;
a first capacitor and a second capacitor accommodated in the housing;
a transformer accommodated in the housing and disposed on the bottom panel, the transformer being configured to serve as a choke coil, the transformer comprising a winding and a pair of cores spaced apart from each other and surrounding the winding, the winding including a portion exposed between the cores, the winding including a lead that is led out from the exposed portion of the winding to an exterior of the transformer, the lead being disposed in a middle position of the cores in a height direction normal to the bottom panel of the housing;
a first substrate facing the bottom panel of the housing, the first substrate being disposed on one side of the lead in a direction perpendicular to the height direction and disposed in a higher position than the middle position in a front view of the transformer as seen from a direction in which the lead is led out from the exposed portion of the winding; and
a second substrate facing the bottom panel of the housing, the second substrate being disposed on the other side of the lead in the direction perpendicular to the height direction and disposed in a higher position than the middle position in a front view of the transformer as seen from a direction in which the lead is led out from the exposed portion of the winding,
wherein the first and second substrates are positioned more distally of the lead than the pair of cores in the direction in which the lead is led out from the exposed portion of the winding,
the conductive portion of the housing further including:
a first boss that mechanically connects the first substrate and the bottom panel and electrically connects a wiring pattern of the first substrate and the bottom panel; and
a second boss that mechanically connects the second substrate and the bottom panel and electrically connects a wiring pattern of the second substrate and the bottom panel,
the first capacitor is provided on the first substrate,
the second capacitor is provided on the second substrate,
a first terminal of the first capacitor is electrically connected to the bottom panel via the wiring pattern of the first substrate and the first boss,
a first terminal of the second capacitor is electrically connected to the bottom panel via the wiring pattern of the second substrate and the second boss,
the power converter further comprising:
a first conductive member that electrically connects the lead and a portion of the wiring pattern of the first substrate electrically connected to a second terminal of the first capacitor; and
a second conductive member that electrically connects the lead and a portion of the wiring pattern of the second substrate electrically connected to a second terminal of the second capacitor,
the first capacitor, the first conductive member, the lead, the second member, the second capacitor, the second boss, the bottom panel, the first boss form a loop circuit, and
at least part of the exposed portion of the winding and part of each of the pair of cores overlap an internal region of the loop circuit in a front view of the transformer as seen from the direction in which the lead is led out from the exposed portion of the winding.

9. The power converter according to claim 8, wherein the first capacitor is disposed on one of a pair of surfaces of the first substrate facing the bottom panel, and
the second capacitor is disposed on one of a pair of surfaces of the second substrate facing the bottom panel.

10. The power converter according to claim 8, wherein the lead includes a portion extending straight from the exposed portion of the winding, and
the at least part of the exposed portion of the winding overlaps the internal region of the loop circuit in a front view of the transformer as seen from a direction along the portion of the lead extending straight from the exposed portion of the winding.

11. The power converter according to claim 8, wherein a whole extent of the exposed portion of the winding overlaps the internal region of the loop circuit in the front view of the transformer as seen from the direction in which the lead is led out from the exposed portion of the winding.

12. A power converter for converting an input voltage into a predetermined voltage, comprising:
a housing comprising a conductive portion;
at least two capacitors accommodated in the housing and electrically connected to the conductive portion of the housing; and
a transformer accommodated in the housing and configured to serve as a choke coil, the transformer comprising a winding and a core surrounding the winding with a portion of the winding being exposed from the core, the winding including a lead that is led out from the exposed portion of the winding to an exterior of the transformer;
wherein the at least two capacitors, the lead, and the conductive portion of the housing form a loop circuit, and
a whole extent of the exposed portion of the winding overlaps an internal region of the loop circuit, in a front view of the transformer as seen from a direction in which the lead is led out from the exposed portion of the winding.

\* \* \* \* \*